(12) United States Patent
Toyozumi et al.

(10) Patent No.: US 8,020,920 B2
(45) Date of Patent: Sep. 20, 2011

(54) OUTER PROTECTIVE ASSEMBLY OF WIRE HARNESS FOR DOOR AND ARRANGING STRUCTURE OF WIRE HARNESS FOR DOOR

(75) Inventors: Morihiko Toyozumi, Yokkaichi (JP); Isao Tsuji, Yokkaichi (JP); Daiki Nagayasu, Yokkaichi (JP); Tsutomu Sakata, Yokkaichi (JP); Tetsuya Fujita, Yokkaichi (JP); Sung-Jin Kim, Yokkaichi (JP)

(73) Assignee: Sumitomo Wiring Systems Ltd., Mie (JP)

( * ) Notice: Subject to any disclaimer, the term of this patent is extended or adjusted under 35 U.S.C. 154(b) by 0 days.

(21) Appl. No.: 12/517,681

(22) PCT Filed: Oct. 30, 2007
(Under 37 CFR 1.47)

(86) PCT No.: PCT/JP2007/071093
§ 371 (c)(1),
(2), (4) Date: Jan. 28, 2010

(87) PCT Pub. No.: WO2008/068980
PCT Pub. Date: Jun. 12, 2008

(65) Prior Publication Data
US 2010/0283287 A1    Nov. 11, 2010

(30) Foreign Application Priority Data

Dec. 6, 2006   (JP) ................................ 2006-329782
Feb. 27, 2007  (JP) ................................ 2007-047903

(51) Int. Cl.
*B60J 5/00* (2006.01)

(52) U.S. Cl. .................................. 296/146.7; 174/152 G
(58) Field of Classification Search ............... 296/146.7, 296/146.9, 208; 174/152 G, 153 G
See application file for complete search history.

(56) References Cited

U.S. PATENT DOCUMENTS
5,879,047 A    3/1999   Yamaguchi et al.
(Continued)

FOREIGN PATENT DOCUMENTS
JP    8-58491    3/1996
(Continued)

OTHER PUBLICATIONS
English language Abstract of JP 2006-117054, May 11, 2006.
(Continued)

*Primary Examiner* — Joseph D Pape
(74) *Attorney, Agent, or Firm* — Greenblum & Bernstein P.L.C.

(57) ABSTRACT

A wire harness for a door is spanned between a door inner panel of a motor vehicle and a vehicle body and is arranged near an indoor side over a weather strip. An outer protective assembly includes a flange outward fitting portion that is mounted on an outer surface of a flange projecting from a door facing surface of the vehicle body and that defines a wire harness threading space for passing the wire harness. The wire harness that passes through the wire harness threading space in the flange outward fitting portion can be arranged in a vehicle body inner panel. The outer protective assembly includes an inner cover and an outer cover. The inner and outer covers are coupled to each other to define a flat space for juxtaposing electrical wires of the wire harness. The inner and outer covers are bent in a U-shaped configuration around the flange to define the flange outward fitting portion.

9 Claims, 12 Drawing Sheets

U.S. PATENT DOCUMENTS

| | | | |
|---|---|---|---|
| 5,994,645 A | 11/1999 | Suzuki et al. | |
| 6,135,538 A * | 10/2000 | Serizawa et al. | 296/146.7 |
| 6,354,651 B1 * | 3/2002 | Mori | 296/146.1 |
| 7,423,224 B2 * | 9/2008 | Puhl | 174/650 |
| 2005/0148212 A1 | 7/2005 | Ojima et al. | |
| 2006/0090920 A1 | 5/2006 | Fujita | |

FOREIGN PATENT DOCUMENTS

| | | |
|---|---|---|
| JP | 9-48241 | 2/1997 |
| JP | 10-934 | 1/1998 |
| JP | 10-53077 | 2/1998 |
| JP | 2000-16194 | 1/2000 |
| JP | 2006-117054 | 5/2006 |

OTHER PUBLICATIONS

English language Abstract of JP 10-53077, Feb. 24, 1998.
English language Abstract of JP 2000-16194, Jan. 18, 2000.
English language Abstract of JP 10-934, Jan. 6, 1998.
English language Abstract of JP 8-58491, Mar. 5, 1996.
English language Abstract of JP 9-48241, Feb. 18, 1997.
U.S. Appl. No. 12/517,628 to Toyozumi et al., filed Jun. 4, 2009.

* cited by examiner

OUTER PROTECTIVE ASSEMBLY OF WIRE HARNESS FOR DOOR AND ARRANGING STRUCTURE OF WIRE HARNESS FOR DOOR

FIELD OF THE INVENTION

This invention relates to an outer protective assembly of a wire harness for a door (hereinafter referred to as a "door harness") and an arranging structure of the door harness protected by the outer protective assembly. In more detail, the door harness spanned from the door to a vehicle body is arranged on an inner surface of a vehicle body inner panel in the vehicle body without inserting the door harness into a through-hole in the vehicle body inner panel, and an end of the door harness can be easily connected to an end of a wire harness arranged on the vehicle body.

BACKGROUND OF THE INVENTION

Before, in the case where electrical components are installed in a side door of a motor vehicle, a door harness that is arranged in the side door and is drawn into a vehicle body is arranged in a space defined between a door outer panel and a door inner panel of the side door. A portion spanned between the door to the vehicle body is sheathed by a grommet. Vehicle body engaging portions provided on the opposite ends of the grommet are fitted in a through-hole in a vehicle body side end surface of the door panel and in a through-hole in the vehicle body panel.

A job of inserting the wire harness into the through-holes in the door panel has been a very hard task. Also, since the door harness in the prior art is arranged near a rotary axle of a hinge between the vehicle body and the door, the door harness is subject to only bending and twisting actions and is not subject to stretching and compressing actions when the door is opened and closed, and the through-holes are disposed near an outdoor side over a weather strip. Accordingly, since it is necessary to provide a waterproofing structure on the grommet sheathing a spanned portion of the door harness, there is a problem that a job for attaching the grommet to the through-holes has required much labor.

In order to overcome the above problem, as shown in FIG. 15, the present applicant has disclosed an arranging structure of a wire harness in JP HEI 10 (1998)-934 (Patent Document 1). In this arranging structure of the wire harness, an inner panel $1a$ of a door 1 is provided on an indoor side surface with a substantially triangular space $1c$. A wire harness W/H is provided with an excess length portion that can follow opening and closing operations of the door. The excess length portion is contained in the triangular space $1c$ and is drawn out from an outlet in the triangular space $1c$ to a vehicle body.

According to the above construction, the wire harness W/H is drawn out from the triangular space $1c$ when the door 1 is opened, and the excess length portion of the wire harness W/H is contained in the triangular space $1c$ when the door 1 is closed. Thus, the wire harness W/H can follow the opening and closing operations of the door 1. Furthermore, since the wire harness W/H is arranged near an indoor side over a weather strip 4, it is not necessary to provide a waterproofing structure.

Although the wire harness W/H can be drawn into the vehicle body without inserting the wire harness W/H into the through-hole in the inner panel $1a$ of the door 1 in the above structure disclosed in Patent Document 1, the wire harness W/H must be inserted into the through-hole $2b$ in the outer panel $2b$ of a vehicle body 2 and the inserted wire harness W/H must be connected through a connector to a wire harness on the vehicle body 2, thereby requiring much expense in time during a vehicle body side job. This causes room for improvement.

Patent Document 1: JP HEI 10 (1998)-934

SUMMARY OF THE INVENTION

Problem to be Solved by the Invention

In view of the above problems, an object of the present invention is to arrange a door harness from a door to a vehicle body without inserting the wire harness into a through-hole in a vehicle body panel as well as a through-hole in the door and to easily connect the door harness to a vehicle body harness.

Means for Solving the Problem

In order to achieve the above object, the present invention provides an outer protective assembly of a wire harness for a door. The wire harness is spanned between a door inner panel of a motor vehicle and a vehicle body and is arranged near an indoor side over a weather strip. The outer protective assembly includes a flange outward fitting portion that is mounted on an outer surface of a flange projecting from a door facing surface of the vehicle body and that defines a wire harness threading space for passing the wire harness. The wire harness that passes through the wire harness threading space in the flange outward fitting portion can be arranged in a vehicle body inner panel.

As described above, in the present invention, since the door harness to be extended to the vehicle body is inserted into the outer protective assembly, and since the flange outward fitting portion of the outer protective assembly sheathes the flange that interconnects the inner and outer panels of the vehicle body to each other, the door harness can pass over the flange and can be extended from the vehicle body outer panel to the vehicle body inner panel, thereby connecting the door harness to the vehicle body harness at the inner panel side.

Thus, it is not necessary to insert the door harness spanned between the door and the vehicle body into the through-hole in the vehicle body panel, thereby facilitating a job of attaching the door harness to the vehicle body panel.

Also, since the door harness is arranged near the indoor side over the weather strip, it is not necessary to provide a waterproofing structure on the spanned portion of the door harness.

Preferably, the outer protective assembly includes an inner cover and an outer cover. The inner and outer covers are coupled to each other to define a flat space for juxtaposing electrical wires of the wire harness. The inner and outer covers are bent in a U-shaped configuration around the flange to define the flange outward fitting portion. The electrical wires are bent in the flange outward fitting portion.

As described above, since the outer protective assembly at the vehicle side includes inner and outer covers, the inner and outer covers can clamp the door harness and threads the door harness in the flat space so that the electrical wires of the door harness are juxtaposed in the flat space. Consequently, it is possible to easily thread the door harness in the outer protective assembly and to reduce an amount of the door harness projecting from the vehicle body panel. Thus, it is possible to prevent a passenger or a driver from contacting with the door harness by reducing the projecting amount and it is possible to make the door harness inconspicuous in appearance.

Also, since the flange outward fitting portion of the outer protective assembly bends the door harness, even if the door harness swings when the door is opened and closed, the swinging action of the door harness can be absorbed by the bent portion of the door harness.

The inner cover of the outer protective assembly may be a sheet made of a resin molding product with stiffness. The outer cover may be made of a resin molding product with stiffness. The sheet-like inner cover may be adhered to the inner surface of the outer cover. In this case, since the sheet-like inner cover is thin, it is possible to reduce an entire thickness of the vehicle body side mounting member and to reduce the projecting amount from the door facing surface of the vehicle body panel.

The outer protective assembly may be formed into an integrated cylindrical molding product.

Preferably, the inner and outer covers are coupled to a vehicle body side end of the grommet that passes the spanned portion of the wire harness. The grommet includes a cylindrical portion, an outer panel contacting portion that surrounds a vehicle body side opening in the cylindrical portion and contacts with a vehicle body outer panel near an outdoor side over the flange projecting position on the vehicle body, and a covering portion that is contiguous with the outer panel contacting portion and is mounted on an outer surface of the vehicle body side mounting portion. The outer cover is layered on an inner surface of the grommet and is provided with the opening communicated with the cylindrical portion opening in the grommet. The inner cover includes a base portion parallel to the outer cover and side walls on the opposite ends of the base plate. The side walls are contacted with the outer cover to define the flat space. The base plate is provided with an engaging clip to be engaged with the vehicle body outer panel.

As described above, since the inner and outer covers of the outer protective assembly at the vehicle body side are coupled to each other, threads the door harness, and are fitted in the covering portion of the grommet, the inner and outer covers can be integrated with the grommet. Since the flange outward fitting portion is secured to the flange at the vehicle side, it is possible to easily attach the inner and outer covers to the vehicle body. Furthermore, since the inner cover is provided with the engaging clip and the inner cover is secured to the vehicle body outer panel by the clip, it is possible to strongly secure the outer protective assembly to the vehicle side panel.

A second invention provides an arranging structure of a wire harness for a door wherein the outer protective assembly sheathes the wire harness spanned between a door inner panel of a motor vehicle and a vehicle body and arranged near an indoor side over a weather strip.

In the arranging structure of a wire harness for a door, there are following three modes for attaching the flange outward fitting portion of the outer protective assembly to the flange of the vehicle body panel.

In a first mode, an opening trim that covers the flange of the vehicle body is cut off. The flange outward fitting portion of the outer protective assembly is fitted in the cut-off portion of the opening trim. The flange outward fitting portion is directly attached to the flange.

According to the above construction, since the flange outward fitting portion is fixed to the flange exposed at the cut-off portion of the opening trim, the flange outward fitting portion attached to the flange does not protrude so greatly from the opening trim, thereby preventing a passenger or a driver from contacting with the flange outward fitting portion. This will be excellent in design.

In a second mode, the flange outward fitting portion of the vehicle body side protective assembly is attached to the opening trim that covers the flange.

According to the above construction, since it is not necessary to carry out a work for attaching the outer protective assembly to the flange and opening trim, a cost in production can be reduced and strength of the flange is not lowered.

In a third mode, the flange is provided on a part of an outer edge with a stepped recess for attachment. The flange outward fitting portion of the vehicle body side protective assembly is attached to the stepped recess. The opening trim covers a surface of the flange outward fitting portion.

According to the above construction, since the opening trim covers the flange outward fitting portion mounted on the flange, it is possible to positively secure the outer protective assembly to the flange. Since the flange outward fitting portion of the outer protective assembly cannot be seen from the outside by the opening trim, it is possible to further enhance a design.

Also, in the arranging structure of a wire harness for a door, preferably, a connector connected to ends of the electrical wires of the wire harness, which is drawn out from the flange outward fitting portion of the outer protective assembly and is disposed at the indoor side of the vehicle body inner panel, is held on and projected from an end of the flange outward fitting portion of the outer protective assembly. A mating connector to be coupled to the door side connector is attached through a connector securing member to the indoor side of the vehicle body inner panel.

As described above, according to the arranging structure of the door harness of the present invention, the door harness is drawn out from the door and spanned to the vehicle body, and is guided to the inner surface of the vehicle body inner panel along the door facing surface of the vehicle body panel by the outer protective assembly. The connector on the vehicle body side distal end of the door harness supported by the outer protective assembly can be connected to a mating connector on a distal end of a vehicle side wire harness that is secured to the vehicle body inner panel under a standby condition.

That is, it is not necessary to insert the door harness into the through-hole in the vehicle body panel even at the vehicle body side, the outer protective assembly is attached to the flange of the vehicle body, and the connector on the door harness distal end is coupled to the mating standby connector fixed on the vehicle body inner panel. Thus, the door harness can be connected to the vehicle body harness.

Also, as described above, since the door harness passing through the outer protective assembly is bent in the flange outward fitting portion, it is possible to absorb vibrations caused upon opening and closing the door. Accordingly, a great load is not directly applied to the terminal contained in the connector on the vehicle body distal end wire harness, and it is possible to prevent the terminal from being damaged or causing a fault in contact.

Furthermore, in the arranging structure of a wire harness for a door, preferably, the door harness arranged in the door of a motor vehicle is extended from the indoor side of the door inner panel to the vehicle body near the indoor side over the weather strip without inserting the door harness into a through-hole to be provided in the door panel, and the door side panel and vehicle body side panel are not provided with through-holes.

In more detail, the grommet sheathes the door harness spanned between the door and the vehicle body. A door side distal end of the grommet is drawn out from the indoor side of the door inner panel and a vehicle body side distal end of the grommet is disposed near the indoor side over a weather strip contacting position. The outer protective assembly is attached to the vehicle body side distal end of the grommet without inserting the grommet into any through-holes in the door side panel and vehicle side panel.

According to the above arranging structure, since it is not necessary to insert the door harness into the through-holes in both panels at the door side and vehicle body side, it is possible to make arrangement of the door harness easy in comparison with the prior art arrangement of the door harness, and it is possible to substantially improve a working efficiency in attachment of the door harness.

Also, since the door harness is disposed near the indoor side over the weather strip, waterproofing measures are not required.

Furthermore, if the door harness is arranged below a door checker by about 50 to 100 mm (millimeters), it is possible to prevent a passenger or a driver from contacting with the door harness by being protected by the door checker.

Effects of the Invention

As described above, according to the outer protective assembly for the door harness to be arranged on the vehicle body side in accordance with the first invention, since the door harness is inserted into the flange outward fitting portion of the outer protective assembly that sheathes the flange that interconnects the inner and outer panels of the vehicle body to each other, the door harness can pass over the flange and can be extended from the vehicle body outer panel to the vehicle body inner panel, thereby connecting the door harness to the vehicle body harness at the inner panel side. Thus, it is not necessary to insert the door harness spanned between the door and the vehicle body into the through-hole in the vehicle body panel.

Also, since the door harness is arranged near the indoor side over the weather strip, it is not necessary to provide a waterproofing structure on the spanned portion of the door harness.

According to the arranging structure of the door harness in accordance with the second invention, since it is possible to insert the door harness into the outer protective assembly and to pass the door harness over the flange of the vehicle body panels, and since a projecting amount of the outer protective assembly from the flange can be reduced, it is possible to arrange the door harness on the indoor side of the vehicle body inner panel without causing a conspicuous appearance.

Furthermore, if the vehicle body side distal end connector of the door harness supported by the outer protective assembly is coupled to the mating connector on the vehicle body side wire harness distal end fixed on the vehicle body inner panel, the door harness distal end connector is coupled to the mating standby connector fixed on the vehicle body inner panel after the outer protective assembly is attached to the vehicle body side flange, thereby simplifying an electrical connecting work.

Figure 1:
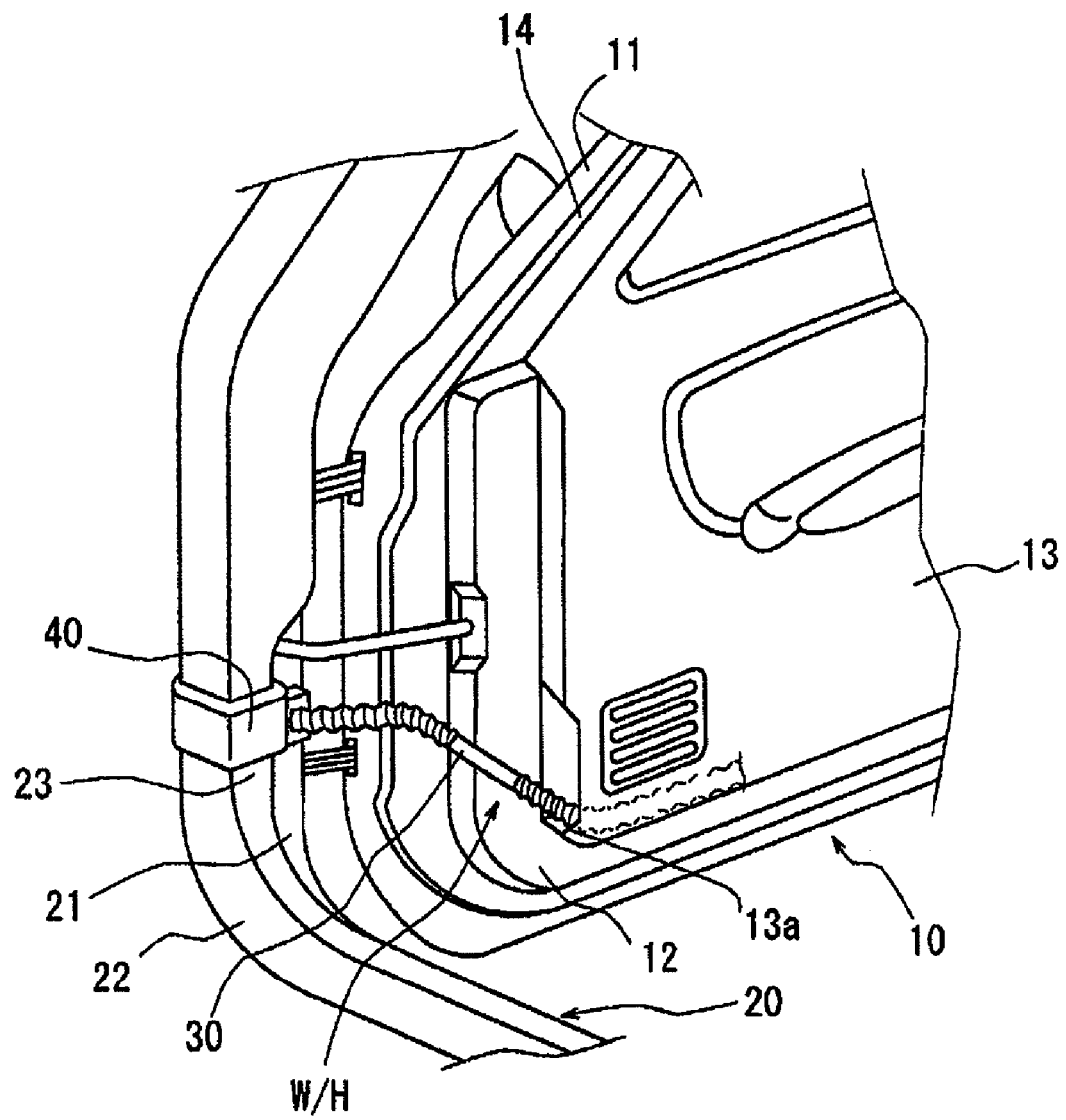
FIG. 1 is a perspective view of a first embodiment of an arranging structure of a door harness in accordance with the present invention.

EXPLANATION OF SIGNS 10 door
11 door outer panel
12 door inner panel
14 weather strip
20 vehicle body
21 vehicle body outer panel
22 vehicle body inner panel
23 flange
24 opening trim
30 grommet
30a bellows cylindrical portion
40 outer protective assembly
40c flange outward fitting portion
41 outer cover
42 inner cover
43 connector
50 mating connector
S wire harness threading space
W/H door harness
W/H2 vehicle body side wire harness

DETAILED DESCRIPTION OF THE INVENTION

Referring now to the drawings, embodiments of an outer protective assembly of a wire harness for a door and an arranging structure of a wire harness for a door protected by the outer protective assembly in accordance with the present invention will be described below.

FIGS. 1 to 7 show a first embodiment of the outer protective assembly and the arranging structure in accordance with the present invention. A wire harness W/H for a door (hereinafter referred to a "door harness" W/H) is arranged in a side door 10 of a motor vehicle and is led to a vehicle body 20. A grommet 30 sheathes a portion of the door harness W/H spanned between the side door 10 and the vehicle body 20. An outer protective assembly 40 covers a portion of the door harness W/H extended to the vehicle body 20. The outer protective assembly 40 is bent along a shape of an indoor side from a weather strip contact position P (FIG. 3) on a vehicle body outer panel 21.

As shown in FIG. 1, the door harness W/H is arranged on the indoor side of a door inner panel 12 coupled to a door outer panel 11 at the side of the side door 10 (hereinafter referred to as a "door" 10). The door harness W/H is contained in a space between the door inner panel 12 and a door trim 13 covering an indoor side of the door inner panel 12. The door harness W/H is drawn out from an opening 13a in the trim 13 to the vehicle body 20. The door harness W/H is spanned between the door 10 and the vehicle body 20 near the indoor side over a weather strip 14.

Figure 2:
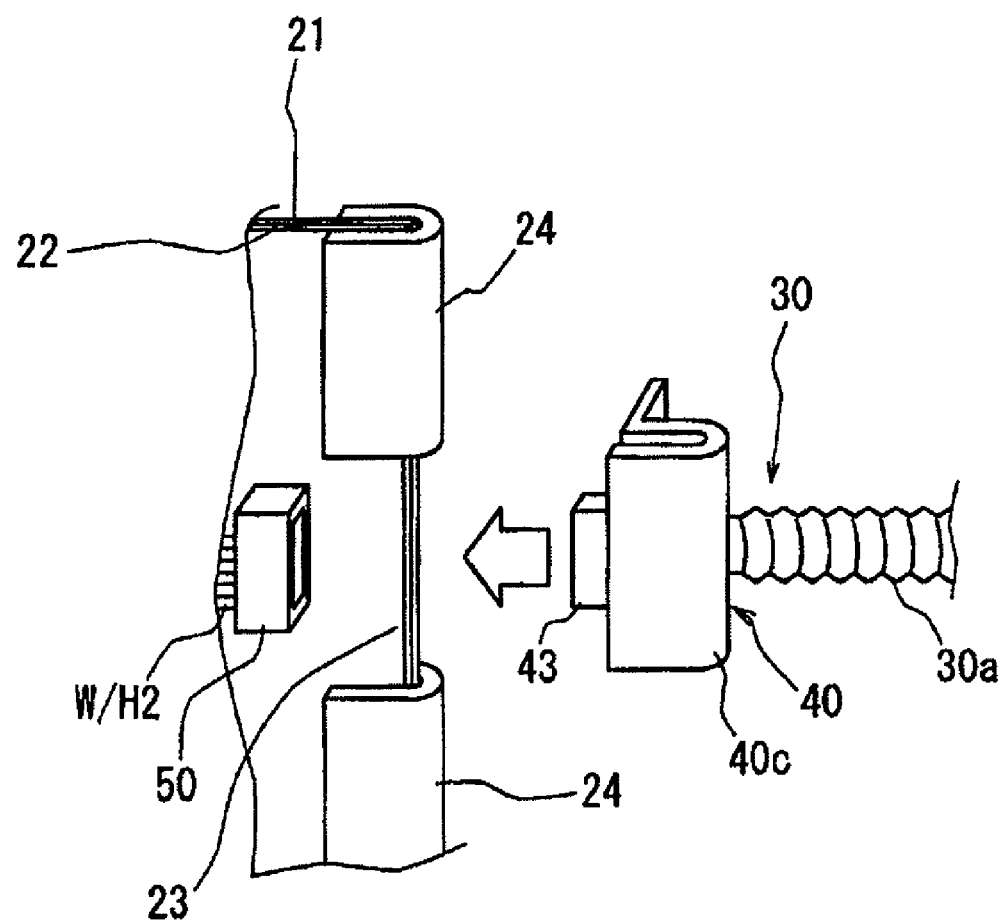
FIG. 2 is a perspective view of an outer protective assembly shown in FIG. 1, illustrating a process for attaching the outer protective assembly to a vehicle body.

Furthermore, the wire harness W/H passes over a flange 23 that interconnects the vehicle body outer panel 21 and the vehicle body inner panel 22 of the vehicle body 20 to each other and that projects toward a door facing surface, is arranged along the indoor side surface of the vehicle body inner panel 22, and is connected to a connector 50 on a wire harness W/H2 arranged on the vehicle body 20, as shown in FIG. 2.

In the first embodiment, as shown in FIG. 2, opening trims 24 that cover the flange 23 on the side of the vehicle body 20 are separated from each other to form a cut-off portion. A flange outward fitting portion 40c of the outer protective assembly 40 is fitted in the cut-off portion so that the flange outward fitting portion 40c is directly attached to the flange 23.

The grommet 30 made of rubber or elastomer sheathes the spanned portion of the door harness W/H, and an engaging portion 30b provided on a vehicle body side distal end of a bellows cylindrical portion 30a of the grommet 30 is attached to and communicated with an engaging portion 40a of the outer protective assembly 40.

Figure 3:
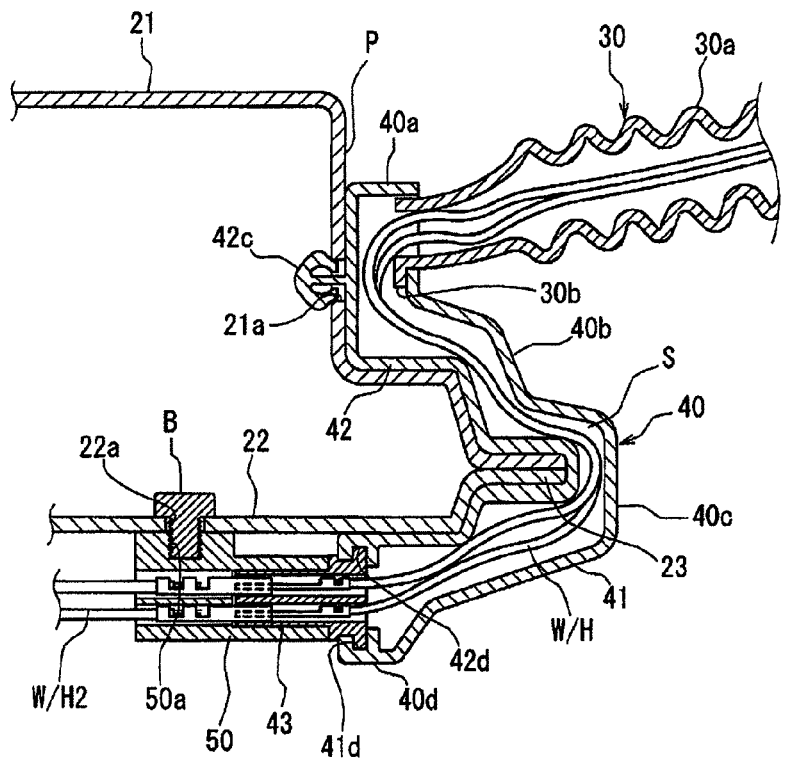
FIG. 3 is a sectional view of the outer protective assembly attached to the vehicle body.
Figure 4:
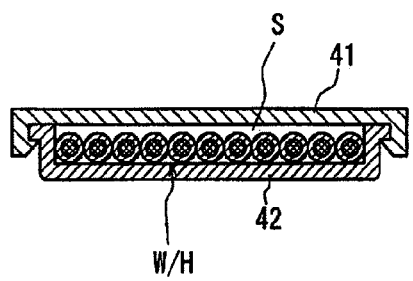
FIG. 4 is a cross sectional view of the door harness arranged in the outer protective assembly.

As shown in FIG. 3, the outer protective assembly 40 includes an outer cover 41 and an inner cover 42 made of a resin molding product made of polypropylene or the like. The inner and outer covers 42 and 41 are disposed in parallel to each other adjacent to a flat wiring space S. As shown in FIG. 4, electrical wires of the door harness W/H drawn out from the grommet 30 are juxtaposed in the wiring space S, and the inner cover 42 is mounted on the electrical wires to integrate them.

As shown in FIG. 3, the outer protective assembly 40 that interconnects the inner and outer covers 42 and 41 to each other receives the engaging portion 30b of the grommet 30 at the distal end of the vehicle body side. The outer protective assembly 40 includes an engaging portion 40a to be engaged with a door side facing surface of the vehicle body outer panel 21, a curved portion 40b bent from the engaging portion 40a, a flange outward fitting portion 40c that is contiguous with the curved portion 40b and is bent into a U-shaped configuration to be fitted to the flange 23 that interconnects the vehicle body inner and outer panels 22 and 21 to each other, and a connector holding portion 40d contiguous with an end of the flange outward fitting portion 40c.

Figure 5A:
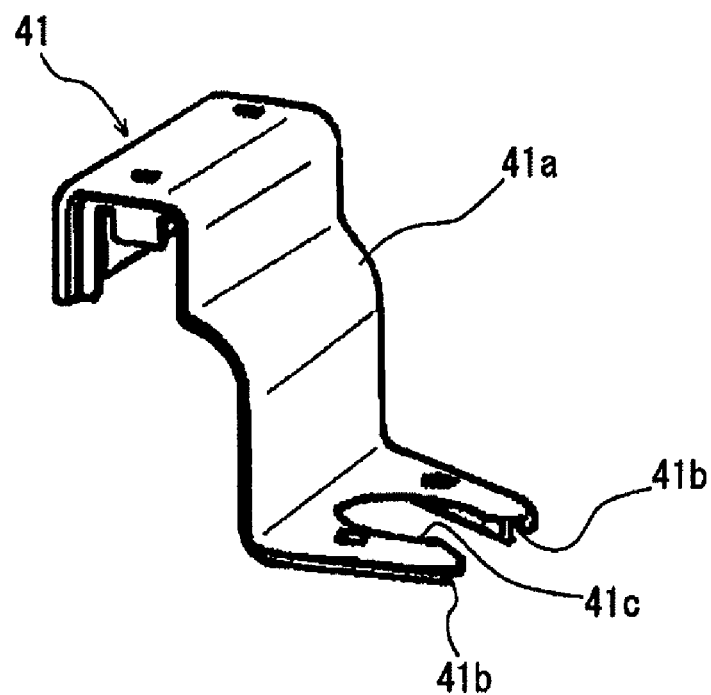
FIG. 5A is a perspective view of an outer cover.
Figure 5B:
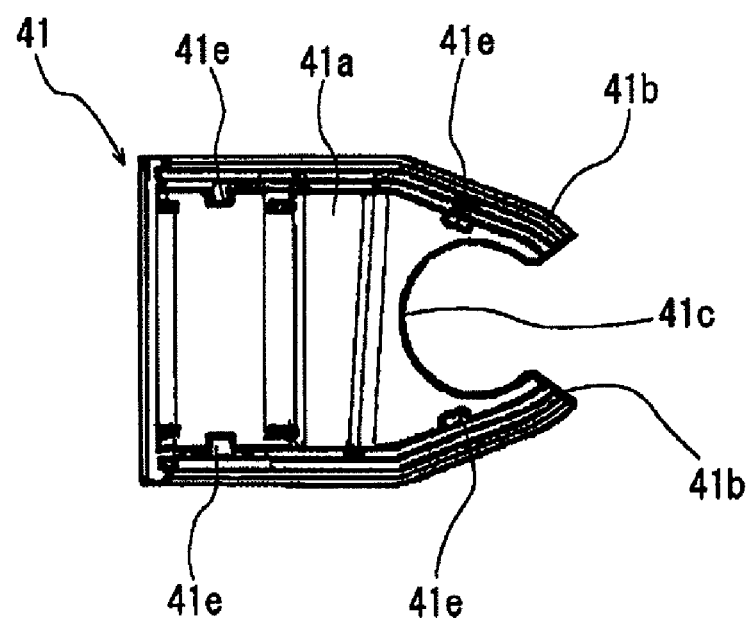
FIG. 5B is a bottom view of the outer cover shown in FIG. 5A.

As shown in FIGS. 5A and 5B, the outer cover 41 includes an outer side wall 41a bent into a desired shape, and side walls 41b, 41b projecting inward from opposite end edges of the outer side wall 41a. The outer cover 41 is provided on an end at the side of the engaging portion 40a with a cut-out portion 41c. The engaging portion 30b of the grommet 30 is fitted on a peripheral surface around the cut-out portion 41c. The outer cover 41 is also provided on an end inner surface at the side of a connector holding portion 40b with a connector receiving groove 41d (FIG. 3) to hold a connector 43. Further, the outer cover 41 is provided at desired positions on the inner surface of the opposite side walls 41b with engaging pawls 41e to lock the inner cover 42.

Figure 6:
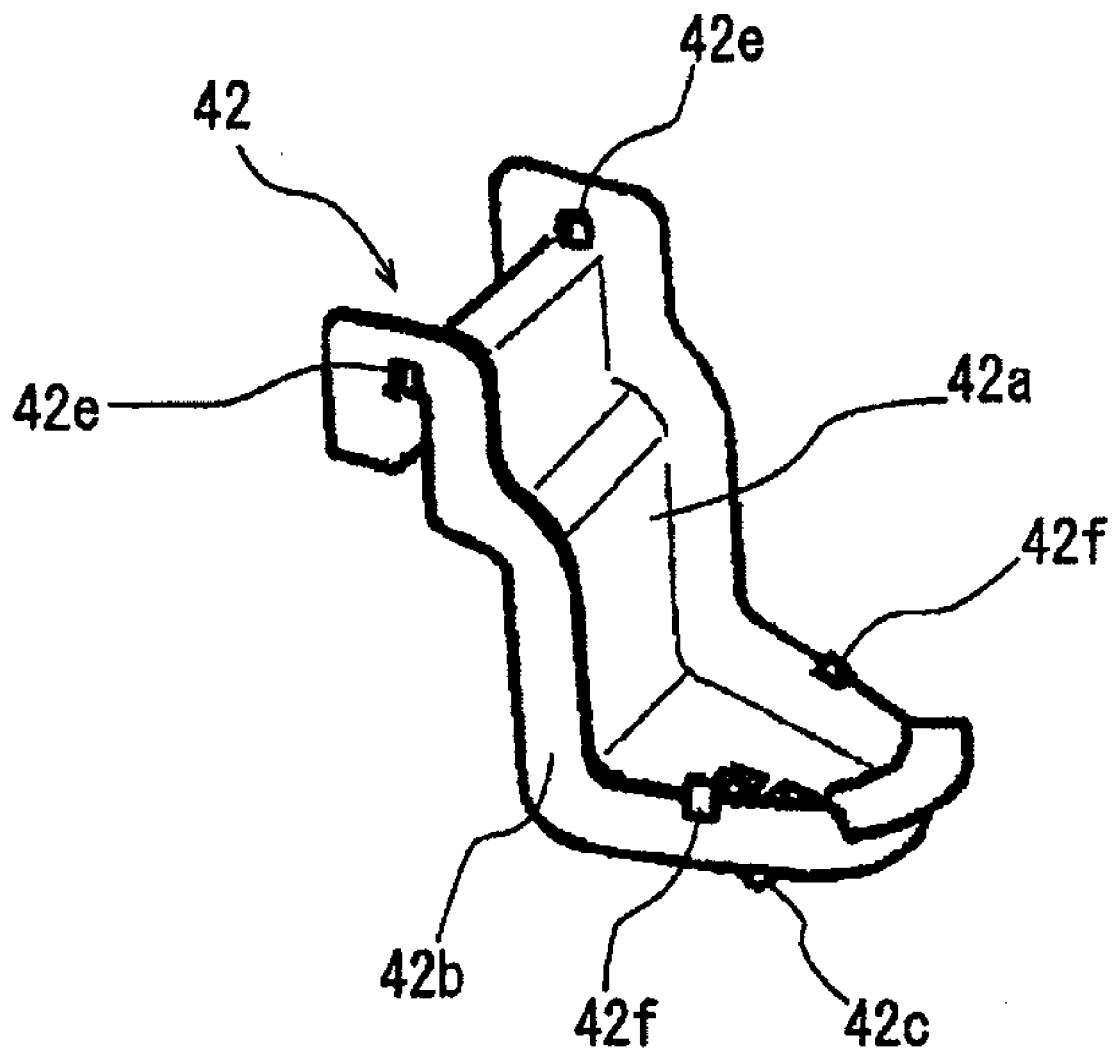
FIG. 6 is a perspective view of an inner cover.

On the other hand, as shown in FIG. 6, the inner cover 42 includes an inner side wall 42a bent in a desired shape so as to extend along the vehicle body inner and outer panels 22 and 21, and side walls 42b projecting outward from the opposite end edges of the inner side wall 42a. The inner cover 42 is provided on an end at the side of the engaging portion 40a with a clip 42c to be engaged with the vehicle body panel and is provided on an end inner surface at the side of the connector holding portion 40d with a connector fitting groove 42d (FIG. 3) so as to receive the connector 43. Furthermore, the inner cover 42 is provided at a desired position on the opposite side walls 42b with engaging apertures 42e and engaging pawls 42f that are engaged with the engaging pawls 41e of the outer cover 41.

Figure 7A:
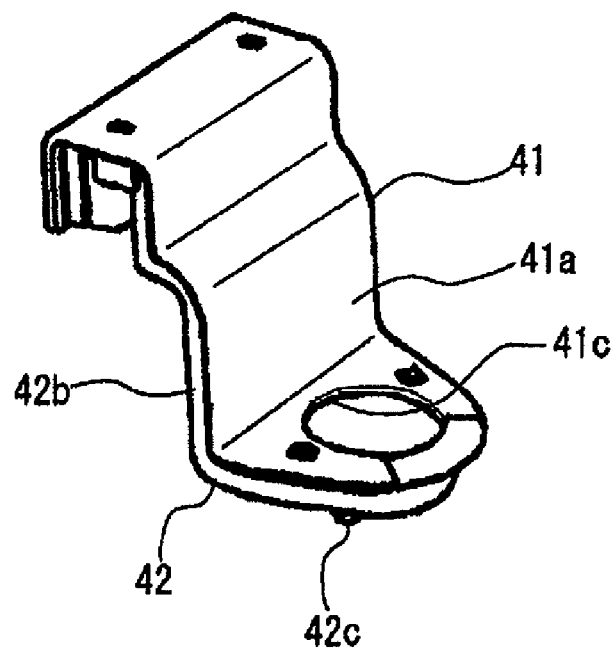
FIG. 7A is a perspective view of the outer cover shown in FIG. 5A, illustrating the outer cover to which the inner cover shown in FIG. 6 is attached.
Figure 7B:
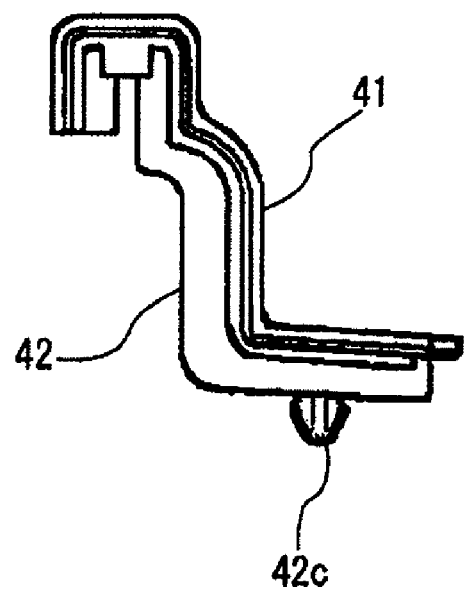
FIG. 7B is a side elevation view of FIG. 7A.

When the inner and outer covers 42 and 41 are coupled to each other, they are formed into a configuration shown in FIGS. 7A and 7B.

The door harness W/H drawn out from a vehicle body side end of the grommet 30 is disposed along the inner surface of the outer side wall 41a of the outer cover 41. The engaging portion 30b of the grommet 30 is engaged with the peripheral surface around the cut-out portion 41c. Thus, the grommet 30 is attached to the outer cover 41. A part of the connector 43 on the distal end of the door harness W/H is received in the connector receiving groove 41d.

Under the above condition, the inner cover 42 is locked on the inner surface side of the outer cover 41, and the inner and outer covers 42 and 41 clamp and hold the connector 43. At this time, the distal end of the connector 43 at the fitting side projects from the outer protective assembly 40 comprising the inner and outer cover 42 and 41.

The engaging aperture 21a is provided on the vehicle body side, to which the outer protective assembly 40 is attached, so that the clip 42d of the outer protective assembly 40 is inserted into and engaged with the engaging aperture 21a. A mating connector 50 connected to an end of a wire harness W/H2 arranged on the vehicle body is secured to the vehicle body inner panel 22 by a bolt to serve as a standby connector. In more detail, the mating connector 50 is provided on an outer surface with a bolt hole 50a (FIG. 3), and the vehicle body inner panel 22 is provided with a through-hole 22a for passing a bolt B. The bolt B is inserted into the through-hole 22a in the vehicle body inner panel 22 and is screwed into the bolt hole 50a in the mating connector 50. Thus, the mating connector 50 is secured to the vehicle body inner panel 22.

An attaching position of the mating connector 50 is set so that the connector 43 connected to the distal end of the door harness W/H is fitted to the mating connector 50 when the outer protective assembly 40 mounted on the door harness W/H is attached to the vehicle body panel.

As described above, when, as shown in FIG. 3, the clip 42c is inserted into and engaged with the engaging aperture 42c in the vehicle body side, the flange outward fitting portion 40c is mounted on the flange 23, and the outer protective assembly 40 is attached to the vehicle body panel, the connector 43 on the end of the door harness W/H is coupled to the mating connector 50 fixed to the vehicle body inner panel 22 and the door harness W/H sheathed by the grommet 30 and outer protective assembly 40 is connected to the wire harness W/H2 arranged on the vehicle body.

Thus, the door harness W/H spanned from the door 10 to the vehicle body 20 can be arranged on the indoor side of the vehicle body inner panel 22 without threading the door harness W/H through the through-aperture in the vehicle body panel.

The grommet 30 is contained in a space between the door inner panel 12 and the trim 13 at the side of the door 10 so that the grommet 30 can be under a flexible condition. When the door is opened, the bellows cylindrical portion 30a is drawn out from the opening 13a in the trim 13 in a substantially straight line. When the door is closed, the bellows cylindrical portion 30a is contained in the space between the door inner panel 12 and the trim 13 in the bent condition so that an excess length of the bellows cylindrical portion is absorbed in the space.

According to the above construction, since the outer protective assembly 40 that sheaths the door harness W/H covers the flange 23 interconnecting the vehicle body inner and outer panels 22 and 21, the door harness W/H can pass over the flange 23 and can be arranged from the vehicle body outer panel 21 to the vehicle body inner panel 22 of the vehicle body 20. The connector 50 of the vehicle body side wire harness W/H2 is attached to the vehicle body inner panel 22 as a standby connector and is connected to the door harness W/H. The outer protective assembly 40 that sheaths the door harness W/H is attached to the vehicle body panel. The connector 43 on the distal end of the door harness W/H is connected to the mating connector 50. Thus, it is possible to easily connect the door harness W/H to the wire harness W/H2 arranged on the vehicle body 20 at the vehicle body inner panel 21. Accordingly, it is not necessary to insert the door harness W/H spanned between the door 10 and the vehicle body 20 into the through-hole in the vehicle body panel and it is possible to facilitate a job of attaching the grommet 30, which receives the door harness W/H, to the vehicle body panel.

Also, as shown in FIG. 3, since the door harness W/H is bent and arranged in an S-shaped posture in the outer protective assembly 40, the bent portion of the door harness W/H can absorb swinging and tensioning actions caused in the electrical wires when the door 10 is opened and closed, thereby preventing a great load from being applied to a terminal on an end of the door harness W/H.

Furthermore, since the door harness W/H is arranged near the indoor side over the weather strip 14, it is not necessary to provide a waterproofing structure on the spanned portion of the door harness W/H.

In addition, since the flange outward fitting portion of the grommet 30 is secured to the flange 23 exposed at the cut-off portion of the opening trims 24, the flange outward fitting portion of the grommet 30 does not protrude greatly from the opening trims 24. It is possible to prevent the flange outward fitting portion from contacting with a passenger or a driver. The flange outward fitting portion is excellent in design.

It should be noted that the outer protective assembly 40 is not limited to the above construction. The inner cover of the outer protective assembly 40 may be formed into a sheet 60 made of resin, such as polytetrafluoroethylene (PTFE) or the like. The sheet 60 is adhered to the inner surface of the outer cover 41 to form a cylindrical body and the door harness W/H may be arranged in the cylindrical body. In this case, the connector connected to the door harness W/H is strongly held by the outer cover and a vehicle body engaging clip is provided on the outer cover.

The outer protective assembly does not have to be formed by the separated inner and outer covers but the assembly may be formed into an integrated molded product having a flat cylindrical shape.

Figure 8A:
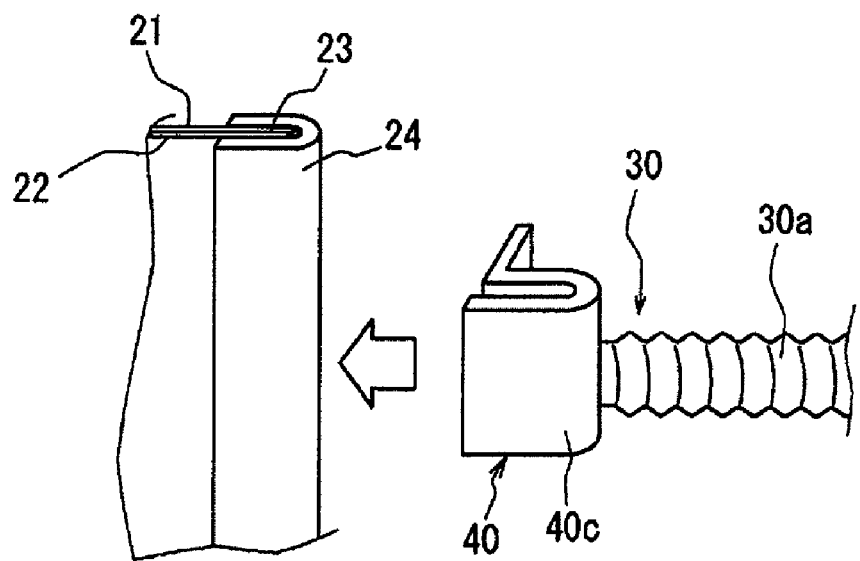
FIG. 8A is a perspective view of a second embodiment of the present invention, illustrating the outer protective assembly in a position disposed before the assembly is attached to the vehicle body.
Figure 8B:
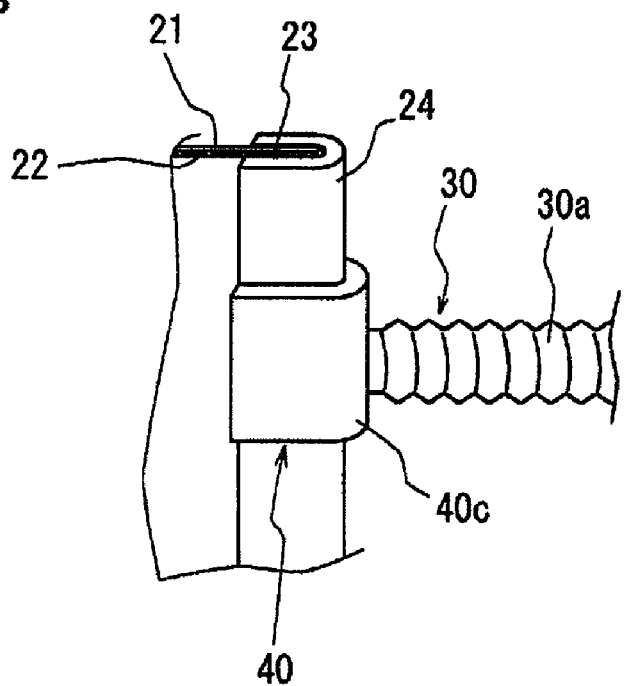
FIG. 8B is a similar view to FIG. 8A, illustrating the outer protective assembly in a position disposed after the assembly is attached to the vehicle body.

FIGS. 8A and 8B show a second embodiment of the present invention.

In the second embodiment, a structure for attaching the outer protective assembly 40 to the flange 23 is different from the structure in the first embodiment.

That is, in the second embodiment, the opening trim 24 that covers the flange 23 is not provided with the cut-off portion. The flange outward fitting portion 40c of the outer protective assembly 40 is mounted directly on an outer surface of the opening trim 24.

The connector connected to the distal end of the door harness W/H is omitted in FIGS. 8A and 8B.

According to the above construction, it is not necessary to insert the door harness W/H spanned between the door 10 and the vehicle body 20 into the through-hole in the vehicle body panel, as in the case of the first embodiment.

Also, since it is not necessary to carry out a job for attaching the grommet 30 to the flange 23 and opening trim 24, a cost in production can be reduced and strength of the flange is not lowered.

Since the other constructions and operational effects in the second embodiment are the same as those in the first embodiment, the explanation of them is omitted by giving the same designators to the same elements.

Figure 9:
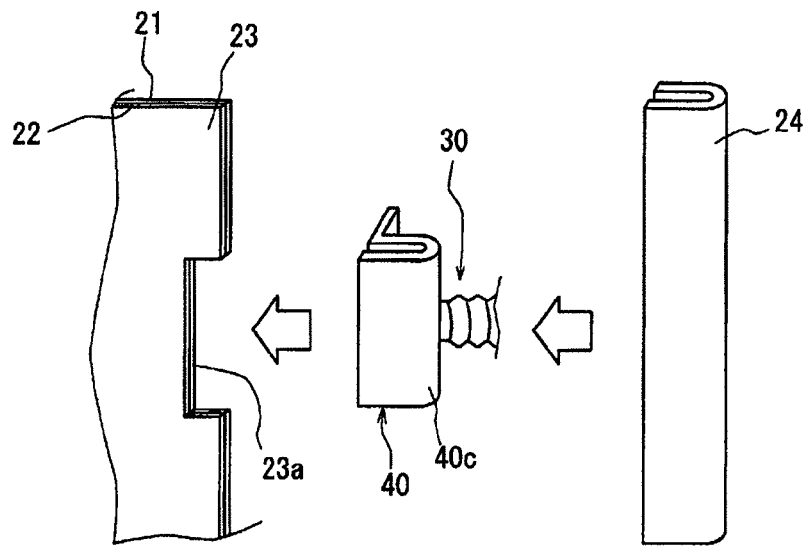
FIG. 9 is a perspective view of a third embodiment of the present invention, illustrating the outer protective assembly in a position disposed before the assembly is attached to the vehicle body.

FIG. 9 shows a third embodiment of the present invention.

In the third embodiment, the flange 23 is provided on a part of an outer edge with a stepped recess 23a, the flange outward fitting portion 40c of the outer protective assembly 40 is attached to the stepped recess 23a, and the opening trim 24 covers the flange outward fitting portion 40c.

The connector connected to the distal end of the door harness W/H is omitted in FIG. 9.

According to the above construction, it is not necessary to insert the door harness W/H spanned between the door 10 and the vehicle body 20 into the through-hole in the vehicle body panel, as in the case of the first embodiment.

Also, since the opening trim 24 covers the flange outward fitting portion 40c of the outer protective assembly 40 mounted on the flange 23, it is possible to positively secure the outer protective assembly 40 to the flange 23. Since the flange outward fitting portion 40c of the outer protective assembly 40 cannot be seen from the outside because covered by the opening trim 24, it is possible to further enhance a design.

Since the other constructions and operational effects in the third embodiment are the same as those in the first embodiment, the explanation of them is omitted by giving the same designators to the same elements.

Figure 10:
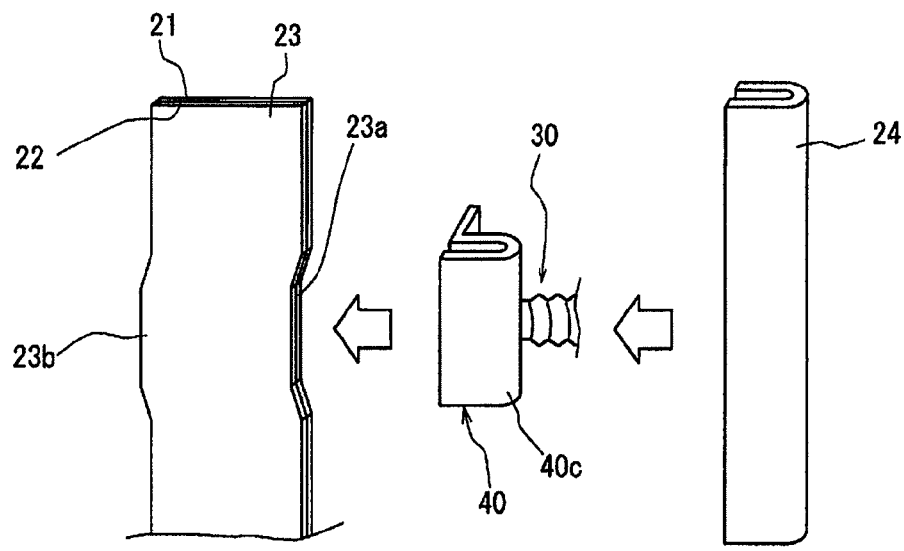
FIG. 10 is a perspective view of an alteration of the third embodiment of the present invention, illustrating the outer protective assembly in a position disposed before the assembly is attached to the vehicle body.

FIG. 10 shows an alteration of the third embodiment.

In the alteration of the third embodiment, the flange 23 is provided on one side with a stepped recess 23a for attachment and on the other side with a stepped projection 23b opposite from the stepped recess 23a to uniform a width of the flange 23.

The connector connected to the distal end of the door harness W/H is omitted in FIG. 10.

According to the above construction, since the flange 23 in the flange 23 does not become a narrow width at the stepped recess 23a, it is possible to prevent to lower strength of the flange.

Since the other constructions and operational effects in the alteration of the third embodiment are the same as those in the first embodiment, the explanation of them is omitted by giving the same designators to the same elements.

Figure 11:
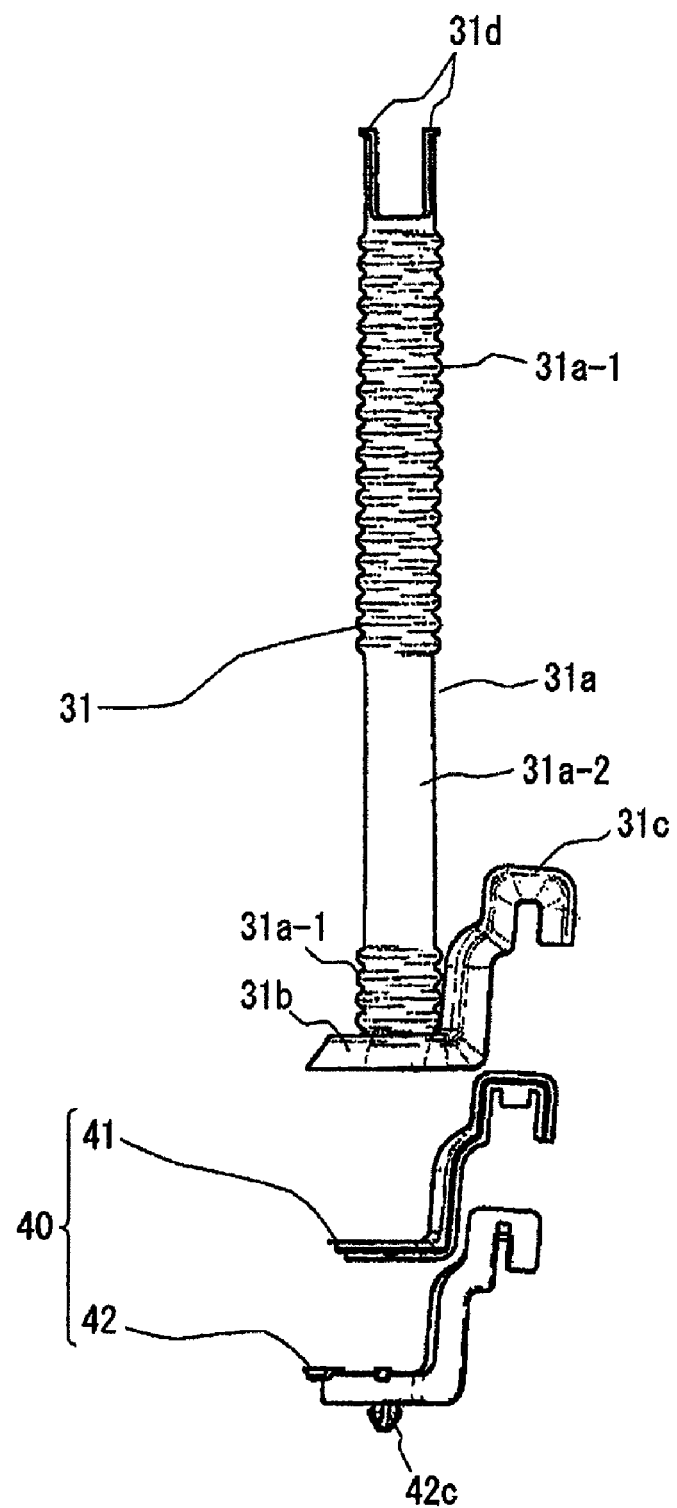
FIG. 11 is an exploded side view of the outer protective assembly and a grommet in a fourth embodiment.
Figure 12:
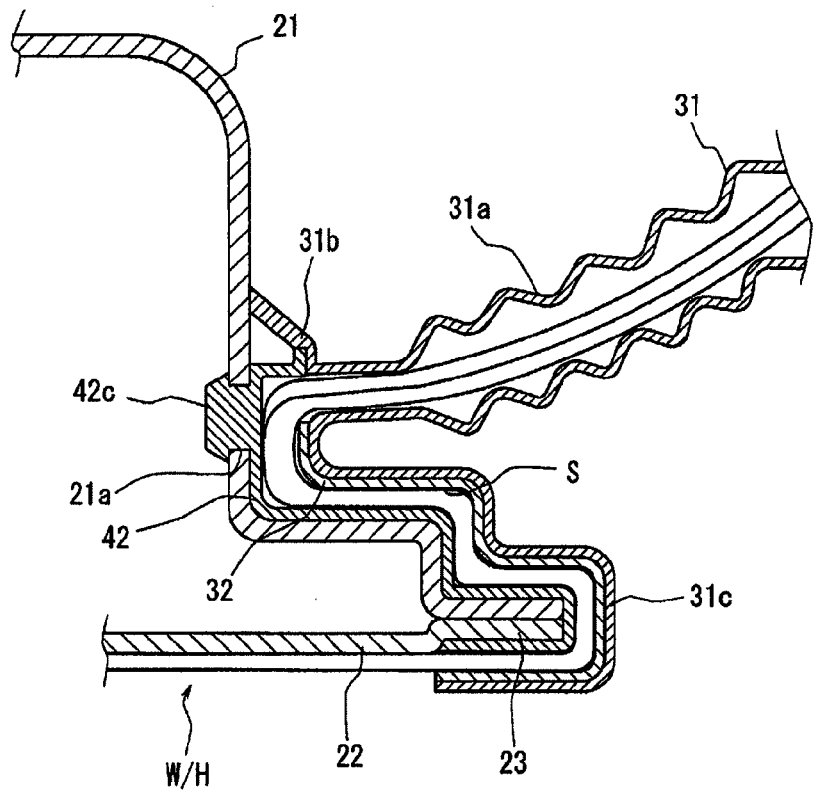
FIG. 12 is a side section view of the outer protective assembly in the fourth embodiment, illustrating the assembly attached to the vehicle body.
Figure 13:
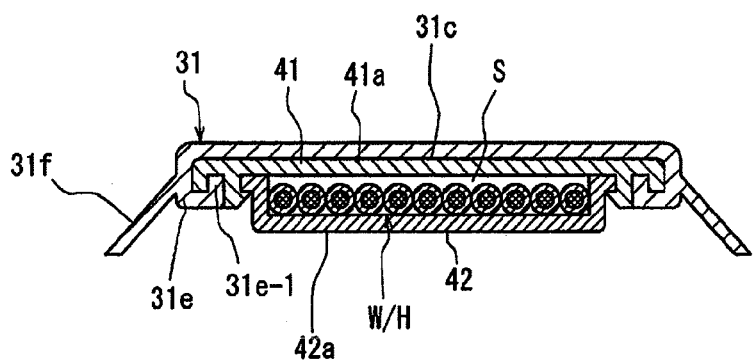
FIG. 13 is a cross section view of the outer protective assembly in the fourth embodiment, illustrating the assembly into which the door harness is inserted.

FIGS. 11 to 13 show a fourth embodiment of the present invention.

The fourth embodiment is different from the first embodiment with respect to the fact that a covering portion for the outer cover 41 is provided on the grommet 31 that sheathes the door harness W/H spanned between the door and the vehicle body. A structure for attaching the outer protective assembly 40 to the vehicle body 20 is the same as that of the first embodiment. The opening trim 24 that covers the flange 23 is cut off, the flange outward fitting portion of the grommet 30 is fitted on the cut-off portion, and the flange outward fitting portion is directly attached to the flange 23.

The grommet 31 that sheathes the spanned portion of the door harness is made of an elastic material, such as rubber or elastomer. The grommet 31 surrounds an opening in a vehicle side distal end of the cylindrical portion 31a and includes an outer panel contacting portion 31b that contacts with the vehicle body side outer panel 21 at the indoor side from the flange projecting position of the vehicle body 20, and a covering portion 31c bent in a U-shaped configuration from the outer panel contacting portion 31b at the side of the flange 23.

The cylindrical portion 31a is provided on the opposite ends with bellows-cylindrical portion 31a-1 on which crests and troughs are formed alternately in an axial direction and is provided on an intermediate part between the bellows cylindrical portion 31a-1 with a flat cylindrical portion 31a-2 having a uniform diameter. The door harness W/H is secured to an open end of the cylindrical portion 31a at the side of the door 10 by means of winding a tape around the door harness and open end. The grommet 31 is provided at the open end with two tongues 31d opposed in a radial direction in order to facilitate a tape-winding operation.

The outer panel contacting portion 31b and covering portion 31c are provided with edging peripheral portions 31e (FIG. 13) extending along the outer edges of the portions 31b and 31c. As shown in FIG. 13, the edging peripheral portions 31e are disposed on the opposite sides of the portions 31b and 31c in a width direction perpendicular to a threading direction of the door harness W/H. Each of the edging peripheral portions 31e is bent inward in an L-shaped configuration at an end to form an engaging portion 31e-1 for engaging with a cover member 32. Furthermore, outer ribs 31f project outward and incline downward from the outer peripheral surface of the edging peripheral portions 31e.

As shown in FIG. 12, an outer side wall 41a of an outer cover 41 is fitted in the edging peripheral portions 31e of the grommet 31 to contact with inner surfaces of the outer panel contacting portion 31b and covering portion 31c.

The other constructions and operational effects in the fourth embodiment are the same as those in the first embodiment.

Figure 14A:
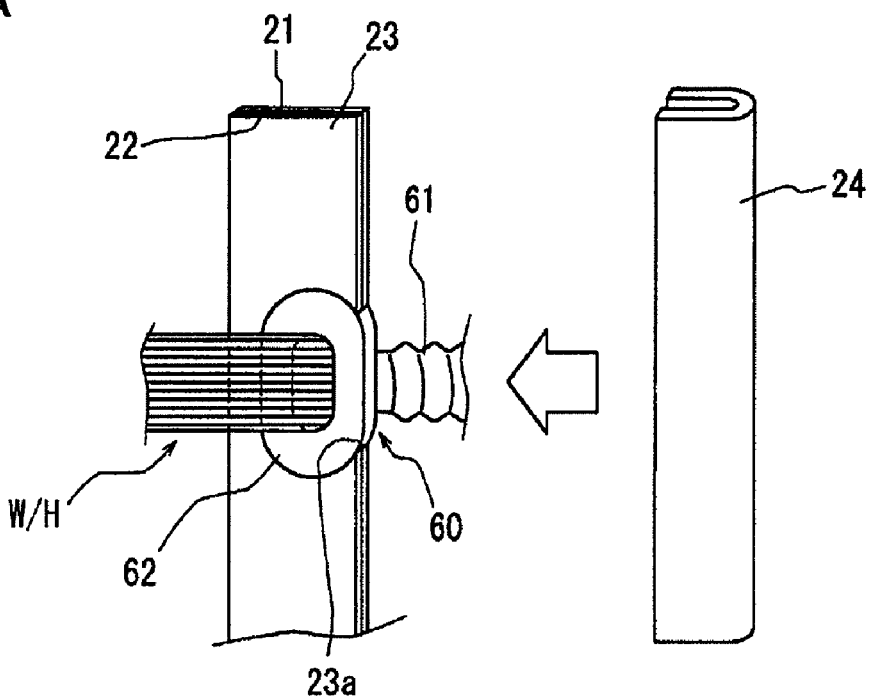
FIG. 14A is a perspective view of a sixth embodiment of the present invention, illustrating the outer protective assembly in a position disposed before an opening trim is attached to the assembly.
Figure 14B:
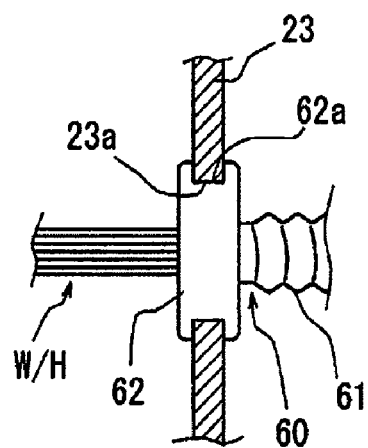
FIG. 14B is a sectional view of the outer protective assembly shown in FIG. 14A.
Figure 15:
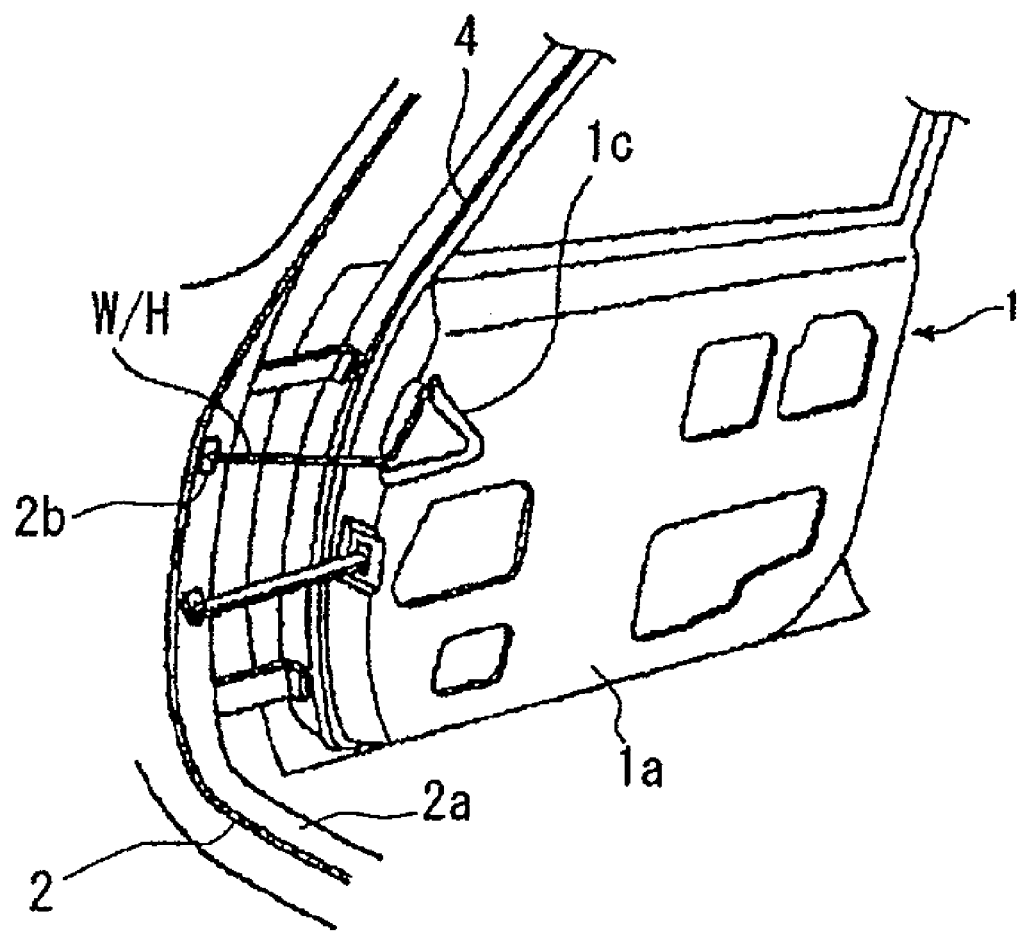
FIG. 15 is a perspective view of a prior art arranging structure of a wire harness for a door.

FIGS. 14A and 14B show a fifth embodiment of the present invention.

In the fifth embodiment, a grommet 60 that sheathes the door harness spanned between the door and the vehicle body extends as a sheathing portion at the vehicle side, a shape of the grommet is different from that in the above embodiments, and the inner and outer covers in the above embodiments are not required.

The grommet 60 in the fifth embodiment is not provided with the outer panel contacting portion and includes a cylindrical portion 61 through which the door harness W/H threads, and a flange fitting cylindrical portion 62 that is contiguous with the cylindrical portion 61 and has a greater diameter and a central axis aligned with that of the cylindrical portion 61. The flange fitting cylindrical portion 62 is provided on an outer peripheral surface with a fitting groove 62a that is fitted in an edge of a stepped recess 23a that is formed by cutting out the flange 23.

After the door harness W/H is inserted into the cylindrical portion 61 of the grommet 60 and is drawn out from the flange fitting cylindrical portion 62, the fitting groove 62a in the flange fitting cylindrical portion 62 of the grommet 60 is fitted in the stepped recess 23a of the flange 23, the grommet 60 is attached to the flange 23, and an opening trim 24 is mounted on the flange 23.

According to the above construction, it is not necessary to insert the door harness W/H spanned between the door 10 and the vehicle body 20 into the through-hole in the panel at the side of the vehicle body 20.

The invention claimed is:

1. An outer protective assembly of a wire harness for a door, wherein said wire harness is spanned between a door inner panel of a motor vehicle and a vehicle body and is arranged near an indoor side over a weather strip;

said outer protective assembly including a flange outward fitting portion that is mounted on an outer surface of a flange projecting from a door facing surface of said vehicle body and that defines a wire harness threading space for passing said wire harness;

said flange outward fitting portion including an inner cover and an outer cover;

said inner and outer covers being coupled to each other to define a flat space for juxtaposing electrical wires of said wire harness, and said inner and outer covers being bent in a U-shaped configuration around said flange;

said inner and outer covers being coupled to a vehicle body side end of a grommet that passes the spanned portion of said wire harness;

said grommet including a cylindrical portion, an outer panel contacting portion that surrounds a vehicle body side opening in said cylindrical portion and contacts with a vehicle body outer panel near an outdoor side over the flange projecting position on said vehicle body, and a covering portion that is contiguous with said outer panel contacting portion and is mounted on an outer surface of said vehicle body side mounting portion;

said outer cover being layered on an inner surface of said grommet and being provided with an opening communicated with said cylindrical portion opening in said grommet;

said inner cover including a base portion parallel to said outer cover and side walls on the opposite ends of said base plate, said side walls being contacted with said outer cover to define said flat space, and said base plate being provided with an engaging clip to be engaged with said vehicle body outer panel; and said wire harness being inserted into said wire harness threading space of said flange outward fitting portion, said wire harness being bent in a U-shaped configuration at a portion passing over said flange so as to be led to a vehicle body inner panel.

2. An arranging structure of a wire harness for a door, wherein said outer protective assembly according to claim 1 sheathes said wire harness spanned between a door inner panel of a motor vehicle and a vehicle body and arranged near an indoor side over a weather strip;

at the vehicle body side, an opening trim that covers said flange being cut off, said flange outward fitting portion of said outer protective assembly being fitted in the cut-off portion of said opening trim, and said flange outward fitting portion being directly attached to said flange.

3. An arranging structure of a wire harness for a door, wherein said outer protective assembly according to claim 1 sheathes said wire harness spanned between a door inner panel of a motor vehicle and a vehicle body and arranged near an indoor side over a weather strip;
at the vehicle body side, said flange outward fitting portion of said outer protective assembly being attached to an opening trim that covers said flange.

4. An arranging structure of a wire harness for a door, wherein said outer protective assembly according to claim 1 sheathes said wire harness spanned between a door inner panel of a motor vehicle and a vehicle body and arranged near an indoor side over a weather strip;
at the vehicle body side, said flange being provided on a part of an outer edge with a stepped recess for attachment, said flange outward fitting portion of said outer protective assembly being attached to said stepped recess, and an opening trim covering a surface of said flange outward fitting portion.

5. An arranging structure of a wire harness for a door, according to claim 2, wherein a connector connected to ends of said electrical wires of said wire harness, which is drawn out from said flange outward fitting portion of said outer protective assembly and is disposed at the indoor side of said vehicle body inner panel, is held on and projected from an end of said flange outward fitting portion of said outer protective assembly; and
wherein a mating connector to be coupled to the door side connector is attached through a connector securing member to said indoor side of said vehicle body inner panel.

6. An arranging structure of a wire harness for a door, according to claim 2, wherein said grommet is drawn out from the indoor side of said door inner panel without inserting the grommet into a through-hole in the door side panel, and the door side panel and vehicle body side panel are not provided with any through-holes.

7. An arranging structure of a wire harness for a door, wherein said wire harness is spanned between a door inner panel of a motor vehicle and a vehicle body and is arranged near an indoor side over a weather strip, an outer protective assembly threads said spanned wire harness at a vehicle body side;
said outer protective assembly including a flange outward fitting portion that is mounted on an outer surface of a flange projecting from a door facing surface of said vehicle body and that defines a wire harness threading space for passing said wire harness, said flange outward fitting portion being attached to an opening trim covering said flange; and
said wire harness that passes through said wire harness threading space in said flange outward fitting portion being arranged in a vehicle body inner panel.

8. An arranging structure of a wire harness for a door, wherein said wire harness is spanned between a door inner panel of a motor vehicle and a vehicle body and is arranged near an indoor side over a weather strip;
said arranging structure including an outer protective assembly that threads said spanned wire harness at a vehicle body side;
said arranging structure including a flange outward fitting portion that is mounted on an outer surface of a flange projecting from a door facing surface of said vehicle body and that defines a wire harness threading space for passing said wire harness;
at the vehicle body side, an opening trim that covers said flange being cut off, said flange outward fitting portion of said outer protective assembly being fitted in the cut-off portion of said opening trim, and said flange outward fitting portion being directly attached to said flange;
a connector connected to ends of said electrical wires of said wire harness, which is drawn out from said flange outward fitting portion of said outer protective assembly and is disposed at the indoor side of said vehicle body inner panel, being held on and projected from an end of said flange outward fitting portion of said outer protective assembly; and
a mating connector to be coupled to the door side connector being attached through a connector securing member to said indoor side of said vehicle body inner panel.

9. An arranging structure of a wire harness for a door, wherein said wire harness is spanned between a door inner panel of a motor vehicle and a vehicle body and is arranged near an indoor side over a weather strip;
said arranging structure including an outer protective assembly that threads said spanned wire harness at a vehicle body side;
said arranging structure including a flange outward fitting portion that is mounted on an outer surface of a flange projecting from a door facing surface of said vehicle body and that defines a wire harness threading space for passing said wire harness;
at the vehicle body side, said flange being provided on a part of an outer edge with a stepped recess for attachment, said flange outward fitting portion of said outer protective assembly being attached to said stepped recess, and said opening trim covering a surface of said flange outward fitting portion;
a connector connected to ends of said electrical wires of said wire harness, which is drawn out from said flange outward fitting portion of said outer protective assembly and is disposed at the indoor side of said vehicle body inner panel, is held on and projected from an end of said flange outward fitting portion of said outer protective assembly; and
a mating connector to be coupled to the door side connector is attached through a connector securing member to said indoor side of said vehicle body inner panel.

* * * * *